April 3, 1951  J. A. DUFFIE ET AL  2,547,859
RAILWAY HATCH COVER AND MEANS
FOR LOCKING THE SAME
Filed April 13, 1948  3 Sheets-Sheet 1
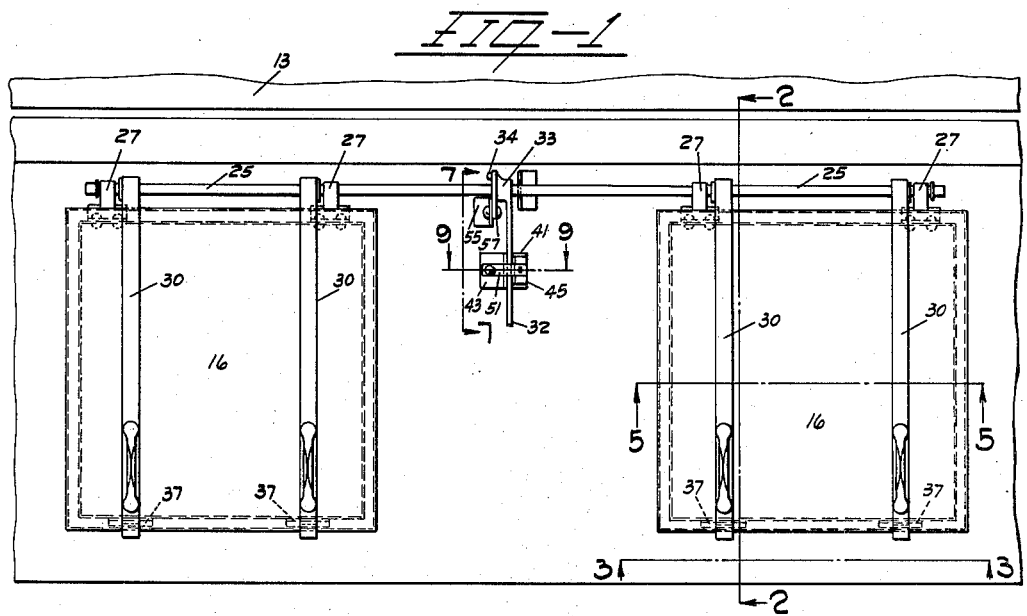
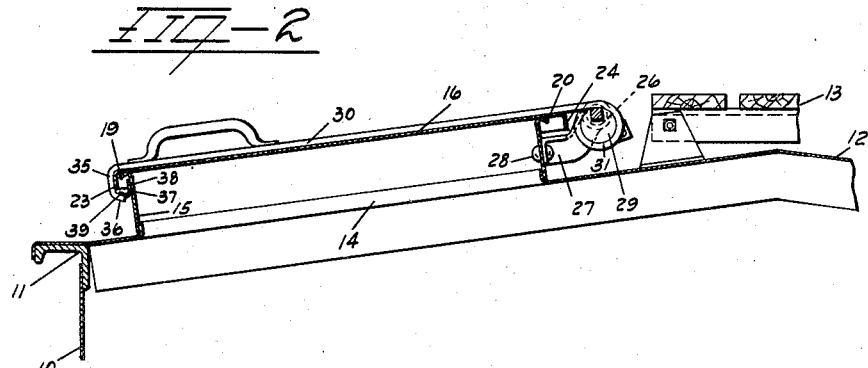
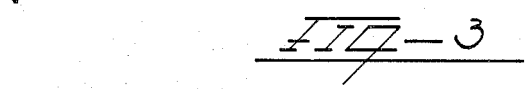
~INVENTORS~
JAMES A. DUFFIE
ARTHUR J. DOYLE
By~ Samuel Reese
ATTY.

April 3, 1951  J. A. DUFFIE ET AL  2,547,859
RAILWAY HATCH COVER AND MEANS
FOR LOCKING THE SAME
Filed April 13, 1948  3 Sheets-Sheet 2
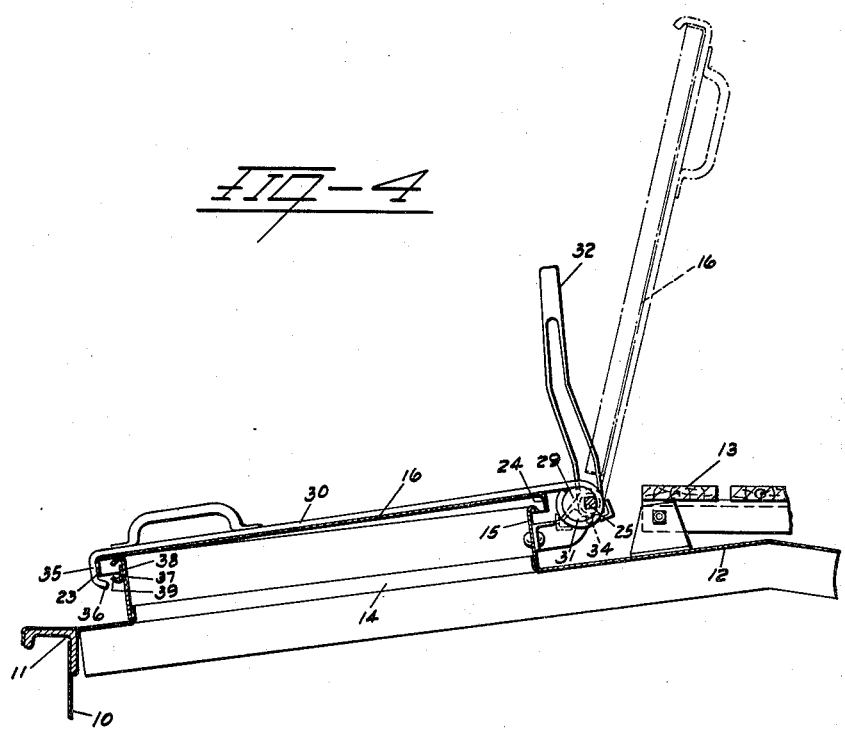
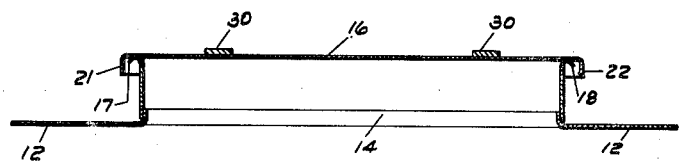
~INVENTORS~
JAMES A. DUFFIE
ARTHUR J. DOYLE
BY~ Samuel Reese
~ATTY~

April 3, 1951
J. A. DUFFIE ET AL
2,547,859
RAILWAY HATCH COVER AND MEANS
FOR LOCKING THE SAME
Filed April 13, 1948
3 Sheets-Sheet 3
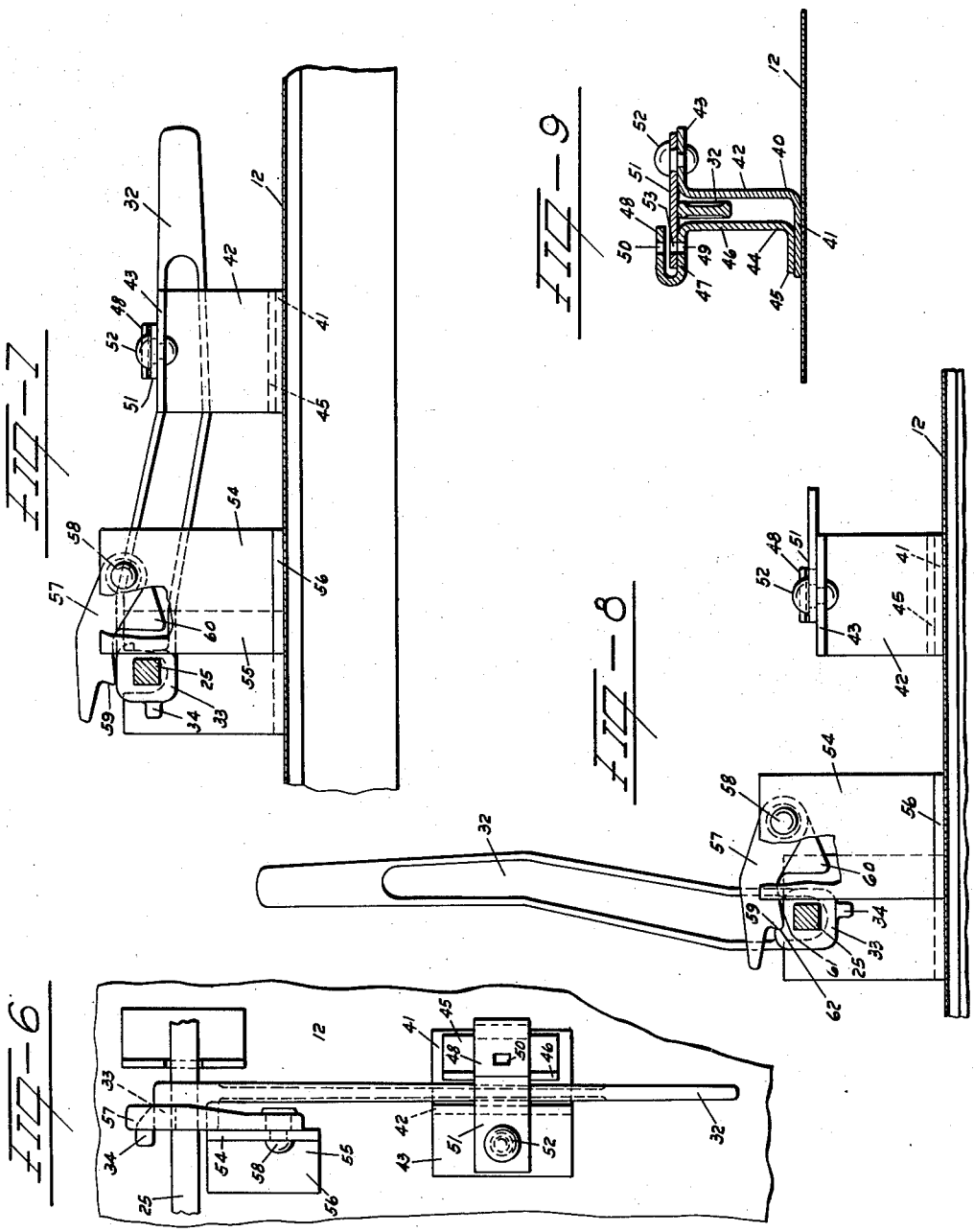
~INVENTORS~
JAMES A. DUFFIE
ARTHUR J. DOYLE
~BY~ Samuel Reese
~ATT'Y~

Patented Apr. 3, 1951

2,547,859

UNITED STATES PATENT OFFICE 2,547,859

RAILWAY HATCH COVER AND MEANS FOR LOCKING THE SAME

James A. Duffie, Chicago, Ill., and Arthur J. Doyle, Cleveland, Ohio, assignors to The Youngstown Steel Door Company, Cleveland, Ohio, a corporation of Ohio Application April 13, 1948, Serial No. 20,754

14 Claims. (Cl. 105—377)

This invention relates to railway hatch covers and means for locking the same and more particularly to hatch covers and their locking means for covered hopper cars.

It is an object of this invention to provide hatch covers so constructed as to obviate the need for sealing means therefor.

A further object is to provide hatch covers which shall embody means for seating the covers tightly upon their frames.

A further object is to provide hatch covers embodying means for locking the covers upon their frames so constructed as to avoid weakening of the covers and eliminate shop operations and cost.

A further object is to provide hatch covers embodying means for locking the covers to their frames by a wedging action.

A further object is to provide hatch covers swingably mounted upon a rotatably supported shaft operable by means of a lever secured to the shaft and constructed to be engageable with an abutment to limit movement of the lever in one direction.

A further object is to provide hatch covers swingably mounted upon a rotatably supported shaft so constructed and arranged as to cooperate with releasable means to prevent rotation of the shaft in one direction.

A further object is to provide hatch covers swingably mounted upon a rotatably supported shaft so constructed and arranged as to cooperate with releasable means to prevent rotation of the shaft in one direction and insure such cooperative relationship.

Other objects of the invention will become clear as the description thereof proceeds.

In the drawings forming part of this specification:

Fig. 1 is a plan view of a portion of a covered hopper car showing hatch covers therefor which embody the instant invention.

Fig. 2 is a vertical section taken on line 2—2 of Fig. 1.

Fig. 3 is a vertical section taken on line 3—3 of Fig. 1.

Fig. 4 is a view similar to Fig. 2 showing the hatch cover closed but unlocked and the corresponding position of the lever in full lines and the cover in open position in dot and dash lines.

Fig. 5 is a vertical section taken on line 5—5 of Fig. 1.

Fig. 6 is a plan view of the lever and its associated structure.

Fig. 7 is a vertical section taken on line 7—7 of Fig. 1, a portion being broken away to show more clearly the members which are adapted to cooperate to prevent rotation of the shaft.

Fig. 8 is a view similar to Fig. 7 showing the members in cooperative relationship.

Fig. 9 is a vertical section taken on line 9—9 of Fig. 1.

The instant invention is an improvement upon the invention disclosed in the patent to Ditchfield, 2,372,369, granted March 27, 1945, and is illustrated as applied to the roof of a covered hopper car. In the drawings only two adjacent hatch covers are shown on one side of the running board of the car roof. It will be understood, however, that additional hatch covers are normally used on the illustrated side of the roof and that a similar arrangement of covers is also utilized on the roof on the opposite side of the running board. Moreover, as illustrated a common shaft is utilized with the pair of hatch covers shown but it will be apparent that this shaft may be extended, if desired, so as to be common to a greater number of hatch covers.

The hopper car utilized to illustrate the instant invention may be of well known design embodying sides, one of which is illustrated at 10, reinforced along their upper margins by means of channel-shaped reinforcing members one of which is shown at 11. The reinforcing members 11 are adapted to support a car roof 12 of well known design which is provided with the usual running board 13. A plurality of hatches are normally formed in this type of hopper car and are made accessible for loading through hatch openings 14 formed in the car roof. A hatch frame 15 is secured to the roof around each of the hatch openings in any desired manner and is adapted to support a hatch cover 16 utilized to close the hatch opening. The hatch frames 15 are similar in construction so that description of one of these frames will suffice. As illustrated, the frames are preferably rectangular in construction and extend upwardly above the roof. The upper margins of the frames are bent so as to provide downwardly and outwardly extending side flanges 17 and 18 and front and rear similarly extending flanges 19 and 20.

The hatch covers 16 are also similar in construction. As shown, they are rectangular in section and are formed preferably of sheet metal as are the hatch frames. Each of the hatch covers is provided with downwardly extending peripheral side flanges 21 and 22 and downwardly extending peripheral front and rear flanges 23 and 24.

The hatches are mounted for movement of translation upon the hatch frames and for swinging movement to open and closed positions. To this end, a shaft 25 is utilized which is preferably rectangular in section as shown in Fig. 2 of the drawings and which is rotatably supported as by means of bushings 26 within bearing members 27 secured as by means of rivets 28 to the hatch frames. As clearly shown in Fig. 1 of the drawings, the shaft is disposed between the rear margin of the hatch frame and the running board so that safety of operation of the hatch covers is insured. A pair of cams 29 at each hatch cover is mounted upon the shaft 25 for rotation therewith. A pair of hinge straps 30 is secured to each of the hatch covers in any desired manner and adjacent to the shaft are formed into eyes 31 which swingably embrace the cams 29.

Rotation of the shaft is effected by means of a lever 32 mounted upon the shaft. The lever is formed with a boss 33 through which the shaft 25 extends. The boss 33 carries a lug 34 for a purpose which will hereinafter appear.

As shown in Figs. 1 and 2 of the drawings, the hinge straps 30 extend across the hatch covers. The forward ends of these straps are turned downwardly as indicated at 35 outwardly of the forward peripheral flange 23 of the hatch cover. Below this flange the hinge straps are turned inwardly and downwardly as indicated at 36. It will be apparent that by means of this construction of the hinge straps the forward peripheral flange 23 of the hatch cover is kept intact.

The inwardly and downwardly turned portions 36 of the hinge straps are adapted to cooperate with angular detents 37 secured as by means of welding to the forward portion of the hatch frame. Each of these detents, as is more clearly shown in Figs. 2 and 3 of the drawings, embodies an attaching flange 38 and an upwardly and outwardly extending flange 39 with which the downwardly and inwardly turned portions of the hinge straps are adapted to cooperate in order to lock the hatch covers upon their frames.

The illustrated hatch covers are shown in their closed and locked position in Figs. 1 and 2 of the drawings. At this time the operating lever 32 lies substantially parallel to the roof 12 and is retained and sealed in such position by the device illustrated in greater detail in Fig. 9 of the drawings. As there shown, this device embodies a substantially Z-shaped member 40 having a flange 41 which is secured to the car roof in any desired manner, a web 42 extending upwardly from the roof and a flange 43. The device embodies additionally a substantially channel-shaped member 44 having a flange 45 seated upon and secured to flange 41 in any desired manner, an upstanding web 46 spaced from web 42 of the Z-shaped member 40 and a flange 47 extending oppositely from flange 43 of the Z-shaped member. Flange 47 of the channel-shaped member is narrower than the web 46 thereof and is formed into a flange 48 which lies above and in spaced relationship to the flange 47. Alined seal-receiving openings 49 and 50 are formed in the flanges 47 and 48, respectively.

The flange 43 of the Z-shaped member 40 is adapted to carry a latching plate 51 which is swingably secured thereto by means of a shouldered rivet 52. The latching plate 51 is formed with a seal-receiving slot 53 adapted when the latching plate is in operative position to be alined with the seal-receiving slots 49 and 50.

With further reference to Fig. 9 of the drawings, it will be apparent that when the operating lever 32 is substantially parallel to the car roof, it is received between the webs 42 and 46 of the Z-shaped member 40 and the channel-shaped member 44 and is retained in this position by means of the latch plate which is adapted to be swung around the pivot 52 so that its free end is received between the flanges 47 and 48 of the channel-shaped member. In this manner the operating lever is latched in its horizontal position and sealed in such position by means of a seal, not shown, passing through the alined seal slots 49, 50 and 53.

When it is desired to position the hatches as illustrated in dot and dash lines of Fig. 4 of the drawings the latch plate 51 is swung to inoperative position and the lever 32 is swung toward the running board of the car roof. This movement of the lever 32 imparts rotation to the shaft 25 and to the cams 29 mounted thereon. A motion of translation is thereby imparted to the hatch covers by means of the cams which rotate within the eyes 31 formed on the hinge straps. Thereupon, the downwardly and inwardly turned portions 36 of the hinge straps become disengaged from the outwardly and upwardly extending flanges 39 of the locking detents 37 so that the hatches may be swung about the cams to the open position shown in Fig. 4 of the drawings.

To close and lock the hatch covers, they are swung to the position shown in full lines in Fig. 4 of the drawings. The lever is then swung to horizontal position and the consequent rotation imparted to the shaft and to the cams mounted thereon causes the hatch covers to slide toward the running board upon the hatch frames and to establish locking engagement between the portions 36 and the flanges 37. In view of their construction the portions 36 of the hinge straps and the flanges 37 of the locking detents set up a downward pressure upon the hatch covers during their motion of translation toward the running board. A tight sealing contact is thereby established between the hatch covers and their frames.

Swinging movement of the operating lever 32 from horizontal to vertical position is limited by the engagement of the lug 34 formed on the hub 33 of the lever with the adjacent edge of the flange 54 of an angle member 55 whose horizontal flange 56 is secured in any desired manner to the car roof 12. The vertical flange 54 carries a catch 57 which is pivotally supported thereon by means of a shouldered rivet 58. As shown more clearly in Figs. 7 and 8 of the drawings, the catch is formed with a shoulder 59 and between said shoulder and the pivot 58 the catch is provided with a depending lug 60. In view of its construction the catch is constantly biased downwardly.

The free end of the catch is supported upon the hub 33 of the operating lever. As shown in Fig. 7 of the drawings this support does not interfere with the rotation of the shaft as the lever is swung from horizontal to vertical position. One face of the hub 33 is undercut as shown at 61 in order to provide a shoulder 62. As the rotation of the shaft proceeds from the position shown in Fig. 7 to that shown in Fig. 8 of the drawings, the shoulder 59 of the catch rides upon the hub 33 of the lever. This continues until engagement of the lug 34 with the vertical flange 54 of the angle member 55 occurs at which time swinging movement of the lever and rotation of the shaft is arrested. When this occurs the shoulder 62 formed on the hub 33 of the lever has passed the shoulder 59 formed on the catch so that engagement between these shoulders as shown in Fig. 8 of the drawings has occurred. As a result of this engagement it is impossible for the shaft to rotate in the opposite direction. While the engagement between these shoulders occurs automatically as the shaft is rotated by the lever, disengagement of the shoulders is effected manually to permit the shaft to be operated in the opposite direction.

As indicated above, the catch is constantly biased downwardly so as to insure automatic engagement between the shoulders 59 and 62. The catch is maintained in proper position by means of the downwardly extending lug 60 formed on the catch which lies in such proximate relationship to the hub 33 of the lever that it is impossible to swing the catch to inoperative position about its pivot.

It will be apparent that numerous changes and modifications in the details of the invention will be clear to those skilled in the art. It is intended, therefore, that all such modifications and changes be comprehended within this invention, which is to be limited only by the scope of the claims appended hereto.

We claim:

1. In a railway car having a roof, spaced hatch openings in said roof, a frame around each opening extending upwardly from said roof, a cover for each of said frames having peripheral downwardly extending flanges, a shaft adjacent to said frames, means rotatably mounting said shaft, means including said shaft for imparting motion of translation to said covers, a lever for rotating said shaft, locking members on said covers extending downwardly therefrom outwardly of the peripheral flange remote from said shaft and then inwardly below said latter flange, and detents on said frame, said inwardly extending portions of said locking members being engaged with and disengaged from said detents upon motion of translation of said covers in opposite directions to lock and unlock said covers.

2. In a railway car having a roof, spaced hatch openings in said roof, a frame around each opening extending upwardly from said roof, a cover for each of said frames having peripheral downwardly extending flanges, a shaft adjacent to said frames, means rotatably mounting said shaft, means including said shaft for imparting motion of translation to said covers, a lever for rotating said shaft, locking members on said covers extending downwardly therefrom outwardly of the peripheral flange remote from said shaft and then inwardly below said latter flange, and detents on said frame, said inwardly extending portions of said locking members being engaged with and disengaged from said detents upon motion of translation of said covers in opposite directions to lock and unlock said covers, said inwardly extending portions and detents being so constructed and arranged that a downward pressure is exerted upon said portions during the motion of translation of said covers which establishes locking engagement between said portions and said detents.

3. In a railway car having a roof, spaced hatch openings in said roof, a frame around each opening extending upwardly from said roof, a cover for each of said frames having peripheral downwardly extending flanges, a shaft adjacent to said frames, means rotatably mounting said shaft, means including said shaft for imparting motion of translation to said covers, a lever for rotating said shaft, locking members on said covers extending downwardly therefrom outwardly of the peripheral flange remote from said shaft and then inwardly below said latter flange, and detents on said frame, said detents having outwardly and upwardly extending means, said inwardly extending portions of said locking members being engaged with and disengaged from said detent means upon motion of translation of said covers in opposite directions to lock and unlock said covers.

4. In a railway car having a roof, spaced hatch openings in said roof, a frame around each opening extending upwardly from said roof, a cover for each of said frames having peripheral downwardly extending flanges, a shaft adjacent to said frames, means rotatably mounting said shaft, means including said shaft for imparting motion of translation to said covers, a lever for rotating said shaft, locking members on said covers extending downwardly therefrom outwardly of the peripheral flange remote from said shaft and then inwardly and downwardly below said latter flange, and detents on said frame, said inwardly and downwardly extending portions of said locking members being engaged with and disengaged from said detents upon motion of translation of said covers in opposite directions to lock and unlock said covers.

5. In a railway car having a roof, spaced hatch openings in said roof, a frame around each opening extending upwardly from said roof, a cover for each of said frames having peripheral downwardly extending flanges, a shaft adjacent to said frames, means rotatably mounting said shaft, means including said shaft for imparting motion of translation to said covers, a lever for rotating said shaft, locking members on said covers extending downwardly therefrom outwardly of the peripheral flange remote from said shaft and then inwardly and downwardly below said latter flange, and detents on said frame, said detents having outwardly and upwardly extending means, said inwardly and downwardly extending portions of said locking members being engaged with and disengaged from said detent means upon motion of translation of said covers in opposite directions to lock and unlock said covers.

6. In a railway car having a roof, spaced hatch openings in said roof, a frame around each opening extending upwardly from said roof, a cover for each of said frames having peripheral downwardly extending flanges, a shaft adjacent to said frames, means rotatably mounting said shaft, cams on said shaft rotatable therewith, hinge straps on said covers, collars on said straps swingably embracing said cams, a lever for rotating said shaft and imparting motion of translation to said covers, said hinge straps extending downwardly outwardly of the peripheral flange remote from said shaft and then inwardly and downwardly below said latter flange, and detents on said frame, said detents having outwardly and upwardly extending flanges, said inwardly and downwardly extending portions of said hinge straps being engaged with and disengaged from said detent flanges upon motion of translation of said covers in opposite directions to lock and unlock said covers.

7. In a railway car having a roof, spaced hatch openings in said roof, a frame around each opening extending upwardly from said roof, a cover for each of said frames having peripheral downwardly extending flanges, a shaft adjacent to said frames, means rotatably mounting said shaft, means including said shaft for imparting motion of translation to said covers, a lever for rotating said shaft, locking members on said covers having inwardly extending portions, and detents on said frame, said detents having outwardly and upwardly extending flanges, said inwardly extending portions of said locking members being engaged with and disengaged from said detent flanges upon motion of translation of said covers in opposite directions to lock and unlock said covers.

8. In a railway car having a roof, spaced hatch openings in said roof, a frame around each opening extending upwardly from said roof, a cover for each of said frames having peripheral downwardly extending flanges, a shaft adjacent to said frames, means rotatably mounting said shaft, means including said shaft for imparting motion of translation to said covers, a lever for rotating said shaft, locking members on said covers having inwardly extending portions, and detents on said frames, said inwardly extending portions and detents being so constructed and arranged that a downward pressure is exerted upon said portions during the motion of translation of said covers which establishes locking engagement between said portions and said detents.

9. In a railway car having a roof, spaced hatch openings in said roof, a frame around each opening extending upwardly from said roof, a cover for each of said frames having peripheral downwardly extending flanges, a shaft adjacent to said frames, means rotatably mounting said shaft, means including said shaft for imparting motion of translation to said covers, a lever for rotating said shaft, locking members on said covers having inwardly and downwardly extending portions, and detents on said frames, said inwardly and downwardly extending portions of said locking members being engaged with and disengaged from said detents upon motion of translation of said covers in opposite directions to lock and unlock said covers.

10. In a railway car having a roof, spaced hatch openings in said roof, a frame around each opening extending upwardly from said roof, a cover for each of said frames having peripheral downwardly extending flanges, a shaft adjacent to said frames, means rotatably mounting said shaft, means including said shaft for imparting motion of translation to said covers, a lever for rotating said shaft, locking members on said covers having inwardly and downwardly extending portions, and detents on said frames, said detents having outwardly and upwardly extending means, said inwardly and downwardly extending portions of said locking members being engaged with and disengaged from said detent means upon motion of translation of said covers in opposite directions to lock and unlock said covers.

11. In a railway car having a roof, spaced hatch openings in said roof, a frame around each opening extending upwardly from said roof, a cover for each of said frames, a shaft adjacent to said frames, means rotatably mounting said shaft, means including said shaft for swingably mounting said covers and imparting motion of translation thereto upon rotation of said shaft, a lever for rotating said shaft, means for locking said covers upon said frames, said lever being operable to rotate said shaft in one direction to shift said covers to unlocked position for swinging movement to open position, and means on said roof engageable with means on said shaft upon completion of rotation of said shaft in said one direction to prevent rotation of said shaft in the opposite direction.

12. In a railway car having a roof, spaced hatch openings in said roof, a frame around each opening extending upwardly from said roof, a cover for each of said frames, a shaft adjacent to said frames, means rotatably mounting said shaft, means including said shaft for swingably mounting said covers and imparting motion of translation thereto upon rotation of said shaft, a lever for rotating said shaft, means for locking said covers upon said frames, said lever being operable to rotate said shaft in one direction to shift said covers to unlocked position for swinging movement to open position, a catch pivotally supported on said roof, and an abutment member on said shaft, said catch being engageable with said member upon completion of rotation of said shaft in said one direction to prevent rotation of said shaft in the opposite direction.

13. In a railway car having a roof, spaced hatch openings in said roof, a frame around each opening extending upwardly from said roof, a cover for each of said frames, a shaft adjacent to said frames, means rotatably mounting said shaft, means including said shaft for swingably mounting said covers and imparting motion of translation thereto upon rotation of said shaft, a lever for rotating said shaft, means for locking said covers upon said frames, said lever being operable to rotate said shaft in one direction to shift said covers to unlocked position for swinging movement to open position, said lever having a hub formed with a shoulder, and a catch pivotally supported upon said roof, said catch being engageable with said shoulder upon completion of rotation of said shaft in said one direction to prevent rotation of said shaft in the opposite direction.

14. In a railway car having a roof, spaced hatch openings in said roof, a frame around each opening extending upwardly from said roof, a cover for each of said frames, a shaft adjacent to said frames, means rotatably mounting said shaft, means including said shaft for swingably mounting said covers and imparting motion of translation thereto upon rotation of said shaft, a lever for rotating said shaft, means for locking said covers upon said frames, said lever being operable to rotate said shaft in one direction to shift said covers to unlocked position for swinging movement to open position, said lever having a hub, a shoulder on said hub, a lug extending from said hub, a supporting member secured to said roof in alinement with said lug, and a catch pivotally mounted on said supporting member, said catch being engageable with said shoulder upon completion of rotation of said shaft in said one direction to prevent rotation of said shaft in the opposite direction, said lug being engageable with said supporting member to limit rotation of said shaft in said one direction.

JAMES A. DUFFIE.
ARTHUR J. DOYLE.

REFERENCES CITED

The following references are of record in the file of this patent:

UNITED STATES PATENTS

| Number | Name | Date |
| --- | --- | --- |
| 2,316,661 | Beauchamp | Apr. 13, 1943 |
| 2,316,675 | Doyle | Apr. 13, 1943 |
| 2,372,369 | Ditchfield | Mar. 27, 1945 |